(12) United States Patent  (10) Patent No.: US 8,271,703 B2
Wang et al.                (45) Date of Patent:     Sep. 18, 2012

(54) PROVIDING DEVICE DEFINED USER INTERFACE MODIFIERS TO A COMPUTER SYSTEM

(75) Inventors: Yao-Tian Wang, Sunnyvale, CA (US); Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 290 days.

(21) Appl. No.: 12/253,823

(22) Filed: Oct. 17, 2008

(65) Prior Publication Data

US 2010/0100832 A1     Apr. 22, 2010

(51) Int. Cl.
G06F 13/12     (2006.01)
G06F 13/38     (2006.01)

(52) U.S. Cl. .......................................... 710/62; 358/1.1

(58) Field of Classification Search .................... None
See application file for complete search history.

(56) References Cited

U.S. PATENT DOCUMENTS

| | | |
|---|---|---|
| 5,467,434 A | 11/1995 | Hower et al. |
| 5,487,168 A * | 1/1996 | Geiner et al. ................ 705/8 |
| 5,513,126 A | 4/1996 | Harkins et al. |
| 5,768,483 A | 6/1998 | Maniwa et al. |
| 5,845,076 A | 12/1998 | Arakawa |
| 5,875,350 A | 2/1999 | Comp et al. |
| 5,996,029 A | 11/1999 | Sugiyama et al. |
| 5,999,945 A | 12/1999 | Lahey et al. |
| 6,148,346 A | 11/2000 | Hanson |
| 6,351,320 B1 | 2/2002 | Shin |
| 6,421,135 B1 | 7/2002 | Fresk et al. |
| 6,453,127 B2 * | 9/2002 | Wood et al. ................ 399/8 |
| 6,501,472 B1 * | 12/2002 | Hunt et al. .............. 345/428 |
| 6,631,010 B1 * | 10/2003 | Foster et al. .............. 358/1.15 |
| 6,671,757 B1 | 12/2003 | Multer et al. |
| 6,694,336 B1 | 2/2004 | Multer et al. |
| 6,738,789 B2 | 5/2004 | Multer et al. |
| 6,757,696 B2 | 6/2004 | Multer et al. |
| 6,789,111 B1 | 9/2004 | Brockway et al. |
| 6,898,624 B2 * | 5/2005 | Young et al. .............. 709/206 |
| 6,967,728 B1 | 11/2005 | Vidyanand |

(Continued)

FOREIGN PATENT DOCUMENTS

JP     2005148953 A     6/2005

(Continued)

OTHER PUBLICATIONS

Xerox, Xerox 4595 Copier/Printer System Administration Guide, Jan. 2008, Xerox, pp. 1-402.*

(Continued)

*Primary Examiner* — Elias Mamo
(74) *Attorney, Agent, or Firm* — Hickman Palermo Truong Becker Bingham Wong LLP (57) ABSTRACT

In an embodiment, a computer-implemented process comprises, in a computer peripheral device that is configured to be coupled to a computer system, creating and storing one or more user interface modifiers that are defined by the device and configured to be used by the computer system to modify rendering of a user interface in the computer system; and providing the device defined user interface modifiers to the computer system. In an embodiment, the device defined user interface modifiers comprise one or more priority values for one or more features of the device; each of the one or more priority values is associated with an identifier of one of the features; and each of the priority values indicates a relative importance of the associated feature in comparison to other features.

23 Claims, 7 Drawing Sheets

U.S. PATENT DOCUMENTS

| | | | |
|---|---|---|---|
| 7,002,703 B2 * | 2/2006 | Parry | 358/1.15 |
| 7,007,041 B2 | 2/2006 | Multer et al. | |
| 7,120,910 B2 * | 10/2006 | Matsuda et al. | 718/102 |
| 7,174,534 B2 * | 2/2007 | Chong et al. | 717/105 |
| 7,180,616 B2 * | 2/2007 | Miyoshi et al. | 358/1.15 |
| 7,312,887 B2 * | 12/2007 | Wu | 358/1.15 |
| 2001/0050684 A1 | 12/2001 | Smith | |
| 2002/0030840 A1 | 3/2002 | Itaki et al. | |
| 2002/0054339 A1 | 5/2002 | Arakawa | |
| 2002/0171857 A1 | 11/2002 | Hisatomi et al. | |
| 2002/0174444 A1 | 11/2002 | Gatto et al. | |
| 2003/0030664 A1 * | 2/2003 | Parry | 345/744 |
| 2003/0033368 A1 | 2/2003 | Tominaga | |
| 2003/0160989 A1 * | 8/2003 | Chapin et al. | 358/1.13 |
| 2003/0174357 A1 | 9/2003 | Lester et al. | |
| 2003/0184782 A1 | 10/2003 | Perkins et al. | |
| 2004/0019628 A1 * | 1/2004 | Puri et al. | 709/203 |
| 2004/0111418 A1 | 6/2004 | Nguyen et al. | |
| 2004/0130744 A1 * | 7/2004 | Wu et al. | 358/1.15 |
| 2004/0179231 A1 | 9/2004 | Savino et al. | |
| 2004/0215665 A1 * | 10/2004 | Edgar et al. | 707/200 |
| 2005/0046886 A1 | 3/2005 | Ferlitsch | |
| 2005/0099650 A1 * | 5/2005 | Brown et al. | 358/1.15 |
| 2005/0111029 A1 * | 5/2005 | Dehart | 358/1.15 |
| 2005/0213136 A1 | 9/2005 | Noyama et al. | |
| 2005/0223390 A1 | 10/2005 | Moore | |
| 2006/0023244 A1 | 2/2006 | Mitsui | |
| 2006/0087682 A1 * | 4/2006 | Lee | 358/1.15 |
| 2006/0120349 A1 | 6/2006 | Taylor et al. | |
| 2006/0221391 A1 * | 10/2006 | Okazawa et al. | 358/1.15 |
| 2006/0268328 A1 | 11/2006 | Park et al. | |
| 2007/0002368 A1 | 1/2007 | Corona | |
| 2007/0013935 A1 | 1/2007 | Uchida | |
| 2007/0086023 A1 | 4/2007 | Kadota | |
| 2007/0097399 A1 | 5/2007 | Boyd et al. | |
| 2007/0132779 A1 | 6/2007 | Gilbert et al. | |
| 2007/0136485 A1 | 6/2007 | Mitsui | |
| 2007/0139441 A1 | 6/2007 | Lucas et al. | |
| 2007/0165031 A1 | 7/2007 | Gilbert et al. | |
| 2007/0174521 A1 | 7/2007 | Aritomi | |
| 2007/0179641 A1 | 8/2007 | Lucas et al. | |
| 2007/0214409 A1 | 9/2007 | Miyata | |
| 2007/0263242 A1 * | 11/2007 | Takahashi | 358/1.14 |
| 2008/0037062 A1 * | 2/2008 | Omino et al. | 358/1.15 |
| 2008/0059978 A1 | 3/2008 | Nishio | |
| 2008/0068635 A1 | 3/2008 | Asano | |
| 2008/0231886 A1 | 9/2008 | Wehner et al. | |
| 2008/0301277 A1 | 12/2008 | Tsujiguchi | |
| 2009/0040549 A1 | 2/2009 | Miyamoto | |
| 2010/0027040 A1 | 2/2010 | Kuroda | |
| 2010/0082782 A1 * | 4/2010 | Ding | 709/222 |
| 2010/0225933 A1 | 9/2010 | Xiao et al. | |
| 2010/0225957 A1 | 9/2010 | Liu et al. | |
| 2010/0225958 A1 | 9/2010 | Selvaraj et al. | |
| 2010/0225959 A1 | 9/2010 | Selvaraj et al. | |

FOREIGN PATENT DOCUMENTS

| | | | |
|---|---|---|---|
| WO | WO 2004/070607 A1 | 8/2004 | |

OTHER PUBLICATIONS

European Patent Office, "European Search Report", application No. EP 07250298, dated Feb. 23, 2010, 8 pages.

U.S. Appl. No. 11/846,884, filed Aug. 29, 2007, Advisory Action, mailed Sep. 19, 2011.

U.S. Appl. No. 11/846,884, filed Aug. 29, 2007, Office Action, mailed Oct. 26, 2011.

U.S. Appl. No. 11/846,884, filed Aug. 29, 2007, Notice of Allowance, mailed Mar. 1, 2012.

U.S. Appl. No. 11/846,869, filed Aug. 29, 2007, Final Office Action, mailed Oct. 27, 2011.

* cited by examiner

Transport Services UI Modifier Table - Display Names 400

| Feature/Option Index 401 | Feature/Option Name 403 | Display Name 405 |
|---|---|---|
| Printer: Staple | Stapling | Staple |
| Printer: Staple Angle | Staple Angle | Angle |
| Printer: Staple Location 402 | Staple Location 404 | Location 406 |
| * * * 408 | * * * | * * * |

Transport Services UI Modifier Table - Constraints 410

| Feature/Option Index 401 | Disallowed Feature/Option 411 | Allowed Feature/Option 413 |
|---|---|---|
| Printer: Staple Location 402 | Printer: Std Output Tray 412 | Booklet Tray 414 |
| | Printer: Hole Punch 416 | Collate_On 418 |
| * * * 408 | * * * | * * * |

Transport Svcs UI Modifier Table - Priorities 420

| Feature/Option Index 401 | Priority 421 |
|---|---|
| Printer: Staple Location 402 | 6    422 |
| * * * 408 | * * * |

Transport Svcs UI Modifier Table - Visibility 430

| Feature/Option Index 431 | Visibility 433 |
|---|---|
| Booklet Tray 432 | True 434 |
| Printer: Hole Punch 436 | False 438 |
| * * * 408 | * * * |

FIG. 4

| CS Priorities UI Modifier Table 520 ||
|---|---|
| Feature/Option Index 501 | Priority 521 |
| Printer: Copies 550 | 1 552 |
| Printer: Media Type 554 | 2 556 |
| Printer: Media Color 558 | 10 560 |
| Printer: Input Tray 562 | 3 564 |
| Printer: Quality 566 | 10 568 |
| Printer: Staple 570 | 6 572 |
| Printer: Staple Angle 574 | 6 576 |
| Printer: Staple Location 502 | 6 522 |
| * * * 508 | * * * |

| CS Constraints UI Modifier Table 510 |||
|---|---|---|
| Feature/Option Index 501 | Disallowed Feature/Option 511 | Allowed Feature/Option 515 |
| Printer: Staple 570 | Standard Output Tray 564 | Collate_On 518 |
| Printer: Staple Angle 574 | Standard Output Tray 544 | 545 |
| | Printer: Hole Punch 570 | 549 |
| Printer: Staple Location 502 | Standard Output Tray 512 | 514 |
| | Printer: Hole Punch 516 | 503 |
| * * * 508 | * * * | * * * |

| CS Visibility UI Modifier Table 530 ||
|---|---|
| Feature/Option Index 531 | Visibility 533 |
| Booklet Tray 532 | True 534 |
| Printer: Hole Punch 536 | False 538 |
| * * * 508 | * * * |

PROVIDING DEVICE DEFINED USER INTERFACE MODIFIERS TO A COMPUTER SYSTEM

TECHNICAL FIELD

The present disclosure relates generally to the generation and rendering of constructs in a user interface.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© 2008 Ricoh Company, Ltd.

BACKGROUND

Computer system applications typically generate user interfaces for the controlling of a device statically using data that has been hard coded into an operating system of the computer, or from a software module such as a device driver or application extensions under the control of an operating system installed on the computer system.

In many cases, the device drivers, applications or application extensions are developed by both a device's manufacturer and the software developer of the operating system installed on the computer system. For example, Microsoft Windows XP® requires device manufacturers to develop device drivers which conform to the Windows XP driver development kit. In many cases, this limits the ability of device manufacturers from fully utilizing all of the features incorporated into their devices when used with the Windows XP operating system.

Moreover, the goals of the device manufacturer and software developer of the operating system usually diverge as the device manufacturer seeks to respond to market demand for its device while the software developer of the operating system seeks to standardize functionality for a broad range of devices in order to ensure operating system stability, minimize device conflicts or prevent the introduction of security vulnerabilities.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

DETAILED DESCRIPTION

In the following description, for the purposes of explanation, numerous specific details are set forth in order to provide a thorough understanding of the various inventive embodiments. It will be apparent, however, to one skilled in the art that the present invention may be practiced without these specific details. In other instances, well-known structures and devices are shown in block diagram form in order to avoid unnecessarily obscuring the present inventive embodiments.

The features and advantages of the various example embodiments contained in this disclosure will become apparent from the following detailed description when considered in conjunction with the accompanying drawings. Where possible, the same reference numerals and characters are used to denote like features, elements, components or portions of the various inventive embodiments. Optional components or features are generally shown in dotted lines.

The order of steps in a process or method is not necessarily required and alternative embodiments may use the same steps of the illustrated embodiments in a different order or may use additional steps or different steps. Other changes and modifications can be made to the described example embodiments without departing from the true scope and spirit of the various inventive embodiments as is generally defined by the Claims.

In this disclosure, the term "comprising" means including the elements or steps that are identified following that term, but any such elements or steps are not necessarily the only elements or steps, and an embodiment may include other elements or steps.

Embodiments are described herein according to the following outline:

1.0 General Overview
2.0 Structural and Functional Overview
3.0 Device Defined User Interface Modifiers
   3.1 Generating device defined user interface modifiers
   3.2 Rendering a user interface with the device defined user interface modifiers
   3.3 Example Data Structures
   3.4 Example User Interfaces
4.0 Implementation Mechanisms—Hardware Overview
5.0 Extensions and Alternatives 1.0 General Overview In an embodiment, a computer-implemented process comprises, in a computer peripheral device that is configured to be coupled to a computer system, creating and storing one or more user interface modifiers that are defined by the device and configured to be used by the computer system to modify rendering of a user interface in the computer system; providing the device defined user interface modifiers to the computer system. In an embodiment, the device defined user interface modifiers comprise one or more priority values for one or more features of the device; each of the one or more priority values is associated with an identifier of one of the features; and each of the priority values indicates a relative importance of the associated feature in comparison to other features.

In an embodiment, the device defined user interface modifiers further comprise one or more display names, one or more constraints, and one or more visibility values; each of the constraints describes whether an associated feature is allowed or disallowed in combination with another feature; each of the visibility values specifies whether an associated feature shall be visible in a user interface display. A display name may specify a name of a device feature to be used in the display, as opposed to an internal name of a function that implements the feature.

In an embodiment, the process further comprises rendering by the computer system a device specific user interface based at least in part upon the provided device defined user interface modifiers.

In an embodiment, the process further comprises generating the device defined user interface modifiers in a native device language and translating the device defined user interface modifiers to a language compatible with the computer system. For example, the native device language may comprise a hexadecimal data format and the language compatible with the computer system may comprise Web Services names.

In an embodiment, the process further comprises creating and storing the device defined user interface modifiers in a user interface modifier table in a memory of the device, wherein the user interface modifier table includes an index for associating a device code with a device feature.

In an embodiment, the index further associates a device code with one or more display names, one or more constraints, or one or more visibility values; each of the constraints describes whether an associated feature is allowed or disallowed in combination with another feature; each of the visibility values specifies whether an associated feature shall be visible in a user interface display. A display name may specify a name of a device feature to be used in the display, as opposed to an internal name of a function that implements the feature.

In an embodiment, the translating comprises creating and storing an intermediary mapping table which associates a native device code with a feature for rendering at least a portion of the user interface by the computer system.

In an embodiment, the process further comprises generating a transport services table that associates feature names in a transport services language to the priority values, and wherein the transport services language is web services.

In an embodiment, the device defined user interface modifiers are dynamically pushed to the computer system when a change to the configuration of the device is self-determined. In an embodiment, the device is a printer coupled to a computer system, or the device is a multifunction printer.

In an embodiment, the process further comprises storing the device defined user interface modifiers in the computer system, and updating the device defined user interface modifiers in the computer system in response to providing new device defined user interface modifiers from the device to the computer system.

In an embodiment, the process further comprises, in the computer system, determining a threshold value, and generating and displaying a user interface for the device, wherein user interface includes only features that are associated with priority values that are lower than the threshold value.

In other example embodiments, the invention encompasses a multifunction peripheral, image forming device, computer apparatus or a computer-readable medium configured to carry out the foregoing processes.

2.0 Structural and Functional Overview

In various example embodiments, a device is programmed to automatically determine the device's actual configuration at the time that a computer system or other client needs to generate a user interface panel for interacting with the device. An example device is a printer, scanner, image forming apparatus, or multifunction printer (MFP). In this context, an "image forming apparatus" is a digital electronic device that comprises an image forming unit such as a copier, facsimile, internet facsimile, printer or multi function peripheral. For example, the image forming unit may comprise a print module configured to process print data and cause a printed version of an electronic document reflected in the print data to be generated at the printing device, and may also comprise logic configured to implement the processes described herein.

Upon determining the device's actual configuration, the device generates device defined user interface modifiers which are provided to a computer system for rendering of a device specific user interface. In this context, a "device defined UI modifier" is data that is determined by a computer peripheral device, rather than data that is determined by a printer driver, operating system, or other software element that is not in or hosted by the device. In addition, a device defined UI modifier may be determined dynamically in real time and may be based upon the firmware, hardware, or software configuration of the device at that particular time.

In an embodiment, the computer system may use the device defined user interface modifiers in conjunction with a device driver, application or application extension, such as a dynamic linked library (DLL) to render the device specific user interface. However, the device driver, application or application extension are not involved in generating or determining the UI modifiers. The computer system is not bound by the features generically made available in device drivers and applications, or application extensions. The term "feature" as used herein refers to any property, option, function or capability of a device.

For example, in printer configurations, a device driver may be provided which requires an end user or a system administrator to determine how the printer is actually configured. The development and coding of the device driver may be shared between the manufacturer of the printer and the manufacturer of the operating system. When a configuration change is made to the printer, a new device driver, application or application extension containing updated user interface display information is generally required in order to properly configure the printer with the new feature(s) provided. In addition, the new printer driver will need to be made available to all computer systems which intend to utilize the new feature(s) provided. Examples of new printer features include, but are not limited to, the addition of a new paper supply bin, output tray, sorter, collator, scanner, or networking capabilities.

The term "user interface modifier" generally refers to values, parameters or descriptors that describe an aspect of a user interface and that may affect the appearance of the user interface when used by appropriate processes, logic or machines. For example, UI modifiers may comprise parameters that are used to help in the displaying of UI content elements, such as how to display the paper type "Letter," in the user interface of a printer, in different languages, or how to constrain the user's selections of combinations of device features.

In an embodiment, the user interface modifiers are in four general categories including a display name, a constraint, a priority and visibility of a feature associated with a particular device. The display name is a descriptive name for a feature of the device; a constraint describes a dependency of a given feature with another feature; visibility is a parameter which indicates whether a feature of the device is to be visible in a user interface; and priority is a parameter which indicates the relative importance of rendering a feature in the user interface.

For example, a device may define the user interface modifiers for an exposed set of features which are communicated to a computer system. The computer system makes use of the provided user interface modifiers in the rendering of a user interface for the device which reflects the actual configuration of the device. An example user interface is a print panel that is generated when a user requests an application to print a document on the device. In another example, the computer system can use the device defined display names for various features to label in a spoken language appropriate to a locale, country or background of a user.

In an embodiment, the constraints allow computer systems to arrange a user interface display appropriately such that invalid combinations of features are not presented to the user. Alternately, constraints may be used to notify the user when an invalid combination of features has been selected. Further, computer systems can display a user interface that is correct based upon the configuration of hardware, firmware or software that is present in a device at the time that the UI is generated, rather than at the time that drivers or other software elements were installed in the computer systems.

In an embodiment, visibility user interface modifiers may be used by a computer system to customize the user interface display for a particular configuration of the device, for example hiding a particular feature the user is not permitted to use or did not pay for. This arrangement may also be useful when a vendor may want to disable certain features based on computer system customization requests or for business reasons. Example business reasons include: a feature is not yet released for use; a feature requires a subscription fee that has not been paid; a feature is restricted to a particular class of user or customer.

In an embodiment, the priority user interface modifier may be used to customize a user interface display for a particular configuration of the computer system. For example, a personal digital assistant (PDA) may lack the processing power or available display space to display all of the features which would be rendered by a standard computer system. To accommodate varying processing or display capabilities, the computer system could be programmed to display only higher priority features and to suppress the display of lower priority features that do not fit in a smaller display. A separate threshold value may be configured to determine the maximum or minimum priority value for a feature that is displayed.

In an embodiment, a self-determining application is provided that initially, periodically or dynamically determines the actual configuration of a device, and provides device defined user interface modifiers to a computer system; in one embodiment, the approach minimizes the amount of information required to be programmed into device drivers for user interface display purposes and allows direct updating of those computer systems needing to implement the new features. The self-determining application of the device generates the needed user interface modifiers and provides the user interface modifiers to a computer system. The computer system thereafter renders a device specific user interface for the device which includes the new feature.

In an embodiment, the self-determining application can also be used to change the user interface when an installed feature becomes unavailable due to repair, expiration of a subscription service or other configuration change which renders a previously available feature unavailable.

Figure 1:
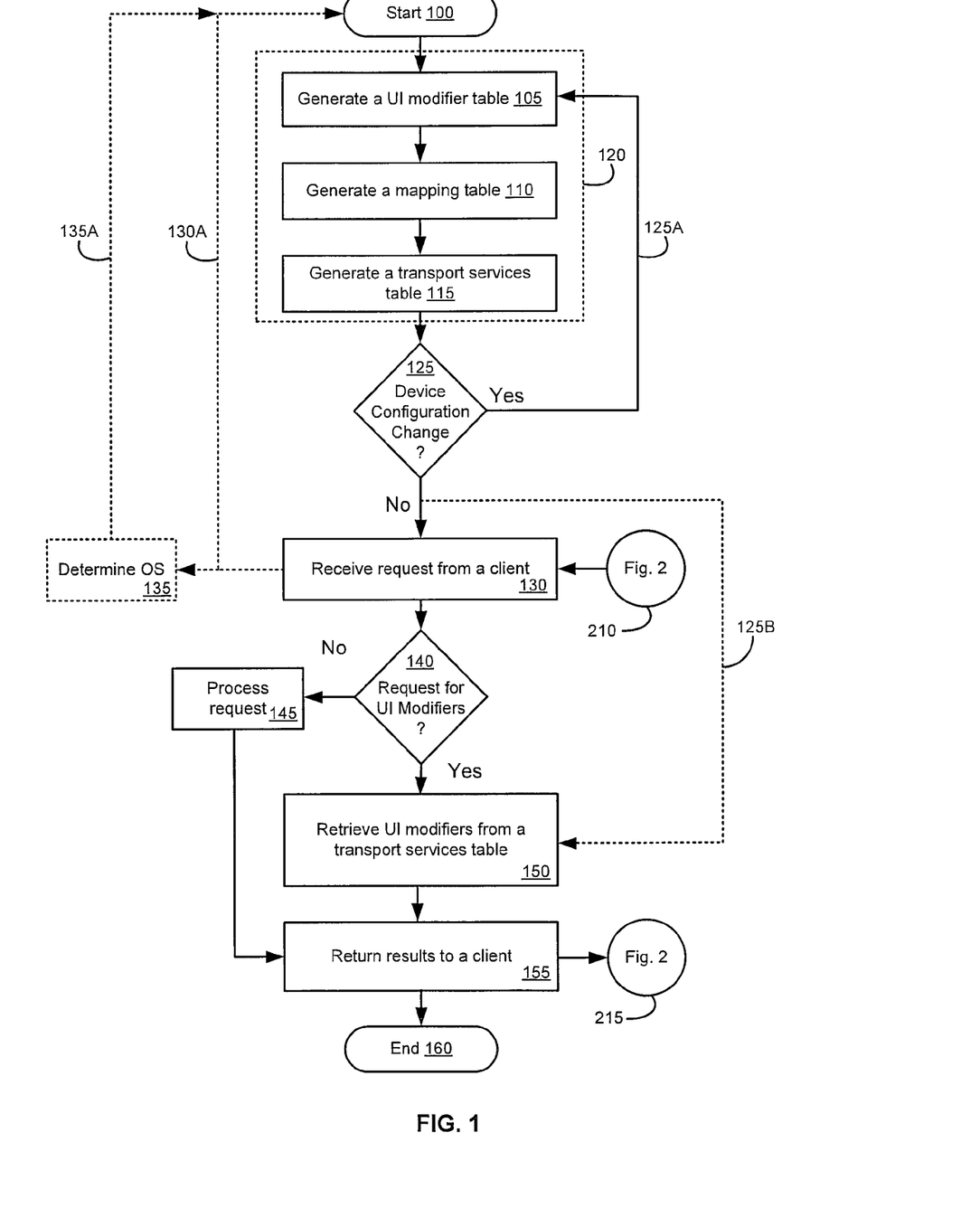
FIG. 1 illustrates a process for generating and providing device defined user interface modifiers in accordance with an example embodiment.

3.0 Device Defined User Interface Modifiers
3.1 Generating Device Defined User Interface Modifiers FIG. 1 illustrates a process for generating and providing device defined user interface modifiers in accordance with an example embodiment. In an embodiment, at block 100 a process is initiated when a device 700A is initially powered up, for example, during an initial power on self-test (POST). Device 700A may have the configuration shown in FIG. 7. A user interface (UI) modifier module 750 installed in device 700A determines the current configuration state of the device and generates device specific UI modifiers. Thus, module 750 may implement the process of FIG. 1.

Figure 2:
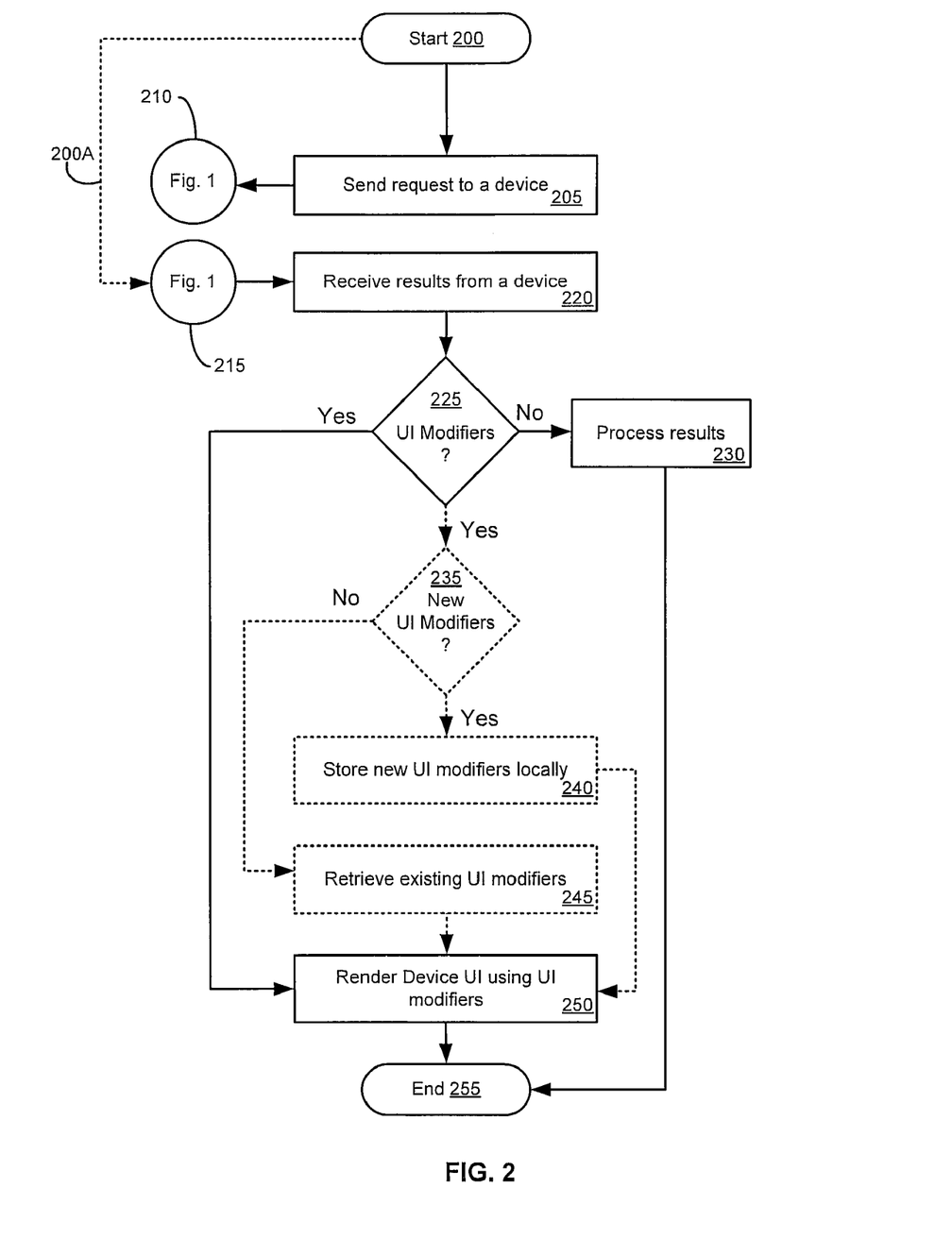
FIG. 2 illustrates an example process for rendering a user interface using device defined user interface modifier by a computer system in accordance with an example embodiment.

In an embodiment, the process of FIG. 1 is initiated in response to receiving a request, represented by circle 210 linking FIG. 1 to FIG. 2 and received at block 130, for the device specific UI modifiers from a computer system 700B as indicated by path 130A. The computer system 700B may have the structure of FIG. 7.

In block 105, a device UI modifier table is generated. In an embodiment, tables 300, 310, 320, 330 of FIG. 3 support the operations of FIG. 1.

Figure 3:
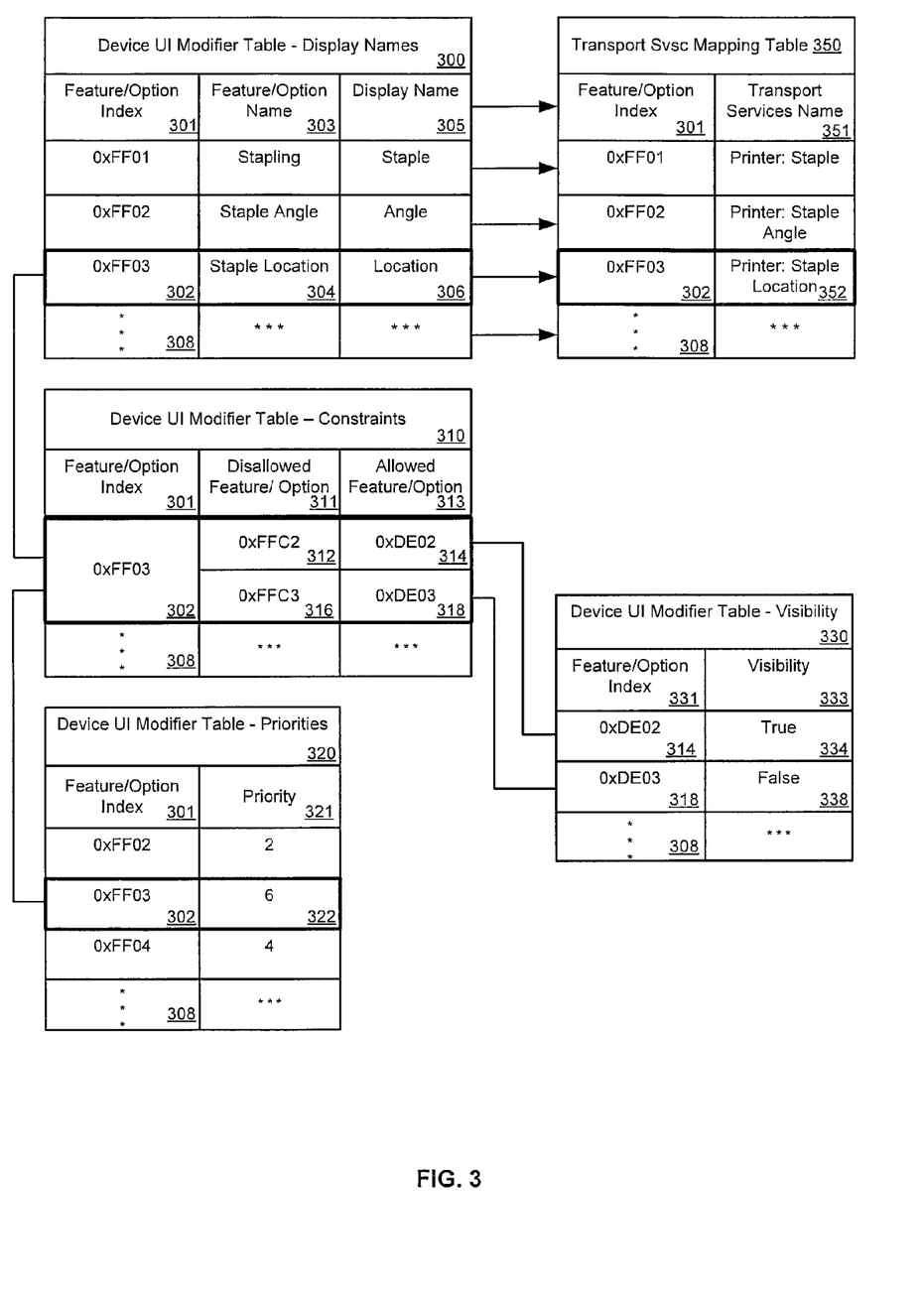
FIG. 3 illustrates a device user interface modifier table in accordance with an example embodiment.

In an embodiment, at block 110 a UI modifier module generates a mapping table from the device specific UI modifier table generated at block 105. For example, mapping table 350 of FIG. 3 is generated. In an embodiment, mapping table 350 of FIG. 3 is used to translate the identifying names of UI modifiers generated at block 105 from a native device language to a language suitable for use by a computer system. For example, the identifying name of modifier 302 in native device language is translated to a corresponding transport services name 352 of FIG. 3. In this context, "language" refers broadly to a data representation format. For example, one language may use hexadecimal strings as words and another language may use combinations of labels or terms in English or another natural language. For example, "stapling" is the natural language name for a device feature; on a particular device the stapling feature may be named "0xFF01" and in Web Services the same feature may be named "Printer: Staple," and table 350 would provide a translation between the device name and Web Services name of the feature.

Figure 4:
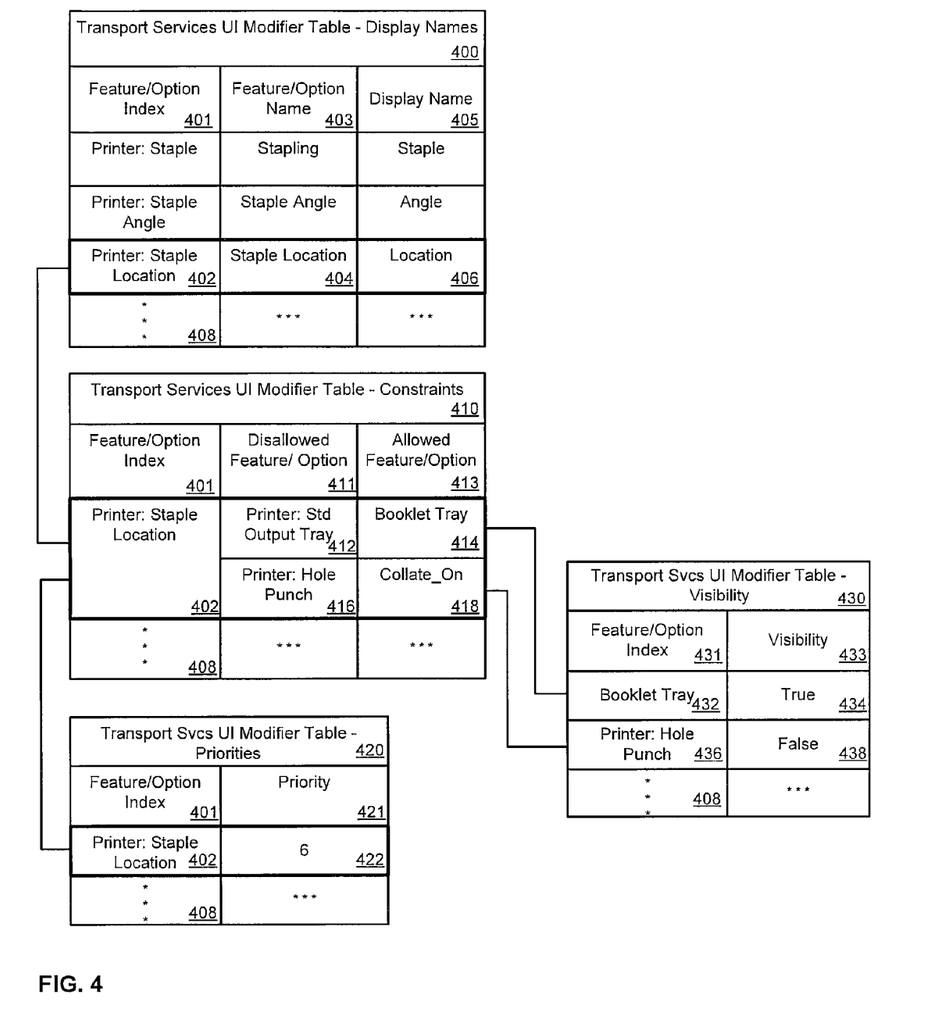
FIG. 4 illustrates a transport services user interface modifier table in accordance with an example embodiment.

In an embodiment, at block 115 a transport services table is generated. FIG. 4 illustrates transport services user interface modifier tables in accordance with an example embodiment. Thus, in an example, in block 115 the translated UI modifiers are incorporated into transport services UI modifier tables 400, 410, 420, 430.

In an embodiment, mapping table 350 generated at block 110 is transitory and is deleted after translation of the device specific UI modifier table of block 105.

In an embodiment, the translated UI modifiers incorporated into transport services UI modifier tables 400, 410, 420, 430 are maintained in a non-volatile memory 715A in the translated language and are readily available for updating, transporting or use by computer system 700B in rendering a device specific UI.

In an embodiment, blocks 105, 110, 115 may be combined into a single process step 120 in which device 700A dynamically generates the UI modifiers and transport services UI modifier tables 400, 410, 420, 430.

In an embodiment, the UI modifiers may also be processed and output by UI modifier module 715A in a language directly usable by the computer system without requiring the generation of device UI modifier tables 300, 310, 320, 330, mapping table 350 or transport services table 400, 410, 420, 430.

Figure 7:
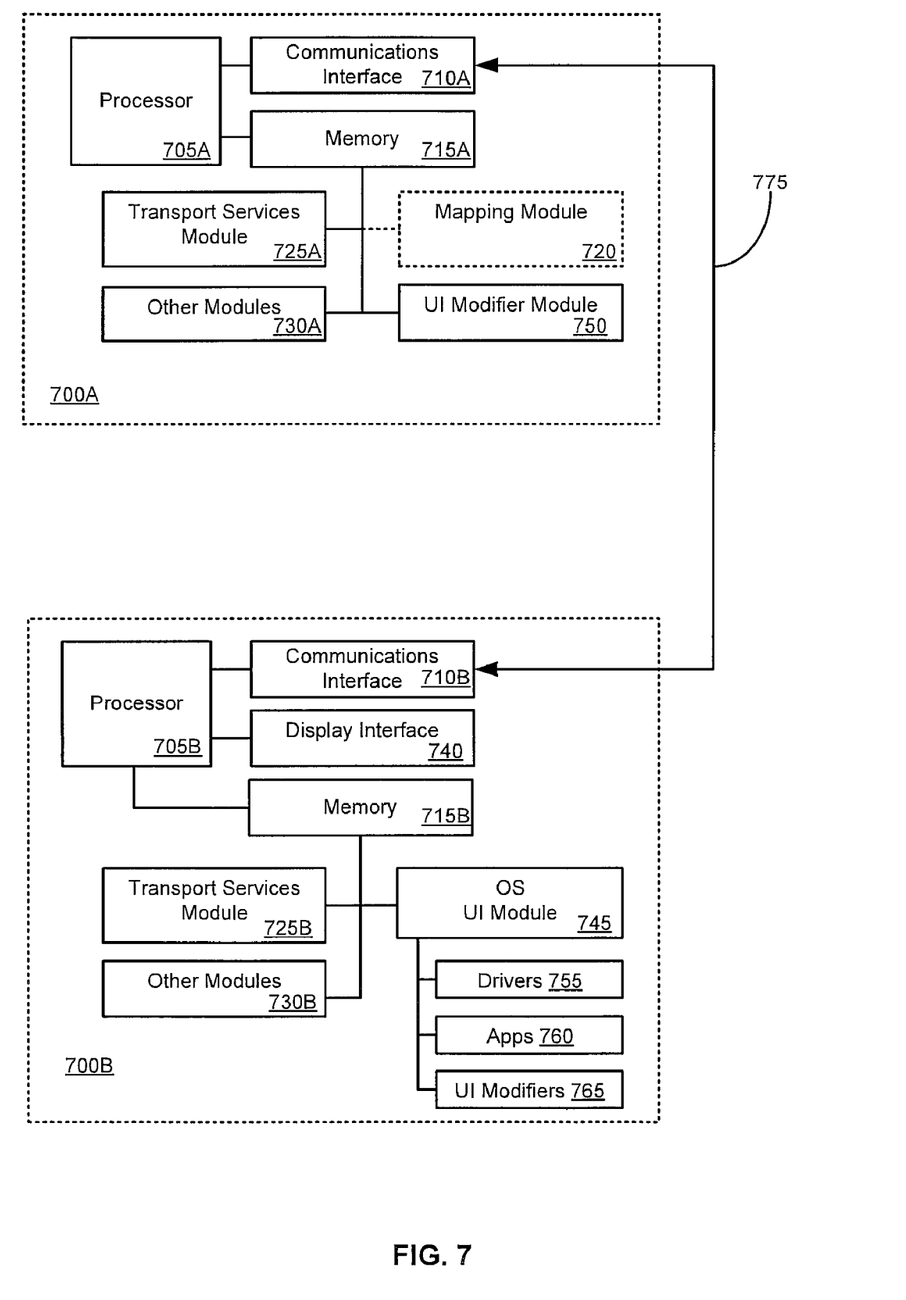
FIG. 7 illustrates a computer system upon which one or more embodiments may be implemented.

In an embodiment, in block 125 a UI modifier module tests whether a device configuration change has occurred in a device. For example, UI modifier module 750 may monitor device 700A and test for changes. If a device configuration change is detected by the UI modifier module, the steps shown in blocks 105, 110, 115 are repeated as indicated by path 125A. Alternatively, if a device configuration change is not detected by the UI modifier module, then in block 130 the UI modifier module waits for a request to be received from a computer system 700B (FIG. 7). In an embodiment, in response to receiving a request for device specific UI modifiers 130, 130A, blocks 105, 110, 115 are performed, as indicated by path 130A.

Request 210 sent from computer system 700B may be provided in any compatible format, language or protocol used by device 700A. For example, request 210 may use a web services specification promulgated by the World Wide Web Consortium (W3C). The "WS-Print" or "Web Services for Print" request as defined by the web services specification may be used. For example, computer system 700B may send request 210 using a "GetPrinterElements" operation. In such operation, request 210 may comprise either a standard element defined by the web services specification, such as "PrinterCapabilities" with display name UI modifier 405 (FIG. 4) embedded inside, or a request for a new extension element such as "UIModifier Visibilities" which would request all visibility UI modifiers included in transport services UI modifier table 430.

In an embodiment, the process determines the appropriate UI modifiers for a particular operating system at block 135, and then control follows path 135A to perform the steps shown in blocks 105, 110, 115. For example, a particular computer system may be using Windows XP® as an operating system. A request received at block 130 is processed by UI modifier module to determine the operating system 135 of the requesting computer system. The UI modifier module identifies the operating system and performs the steps shown in blocks 105, 110, 115, which generate the UI modifiers appropriate for Windows XP. Analogously, a computer system using for example, Apple OS-X, PalmOS or Linux causes UI modifier module 750 to generate the UI modifiers appropriate for OS-X, PalmOS or Linux.

In an embodiment, a test at decision block 140 determines whether requesting computer system 700B of block 130 is requesting UI modifiers. If requesting computer system 700B is not requesting UI modifiers, then request 210 is processed at block 145, and results 215 are returned to computer system 700B at block 155, and processing ends at block 160.

Alternately, if requesting computer system 700B of block 130 is requesting UI modifiers, then the process proceeds to block 150. The UI modifier module retrieves the updated UI modifiers maintained in transport services UI modifier table of block 115, returns the UI modifiers to computer system 700B at block 155 and ends processing at block 160.

In another embodiment, the process for generating device defined UI modifiers does not wait for request from a computer system as indicated by path 125B. In this embodiment, as a result of a device configuration change detected at decision block 125, the process continues at block 150. The UI modifier module retrieves the updated UI modifiers maintained in the transport services table of block 115 and "pushes" the updated UI modifiers to the computer system as shown in blocks 155, 215. The process then ends at block 160.

In some embodiments, the process may not end at step 160. Instead, the process may loop on path 125A to detect a device configuration change, for as long as the device is powered up.

In an embodiment, other new extensions to the web services specification may be included in either request 210 or results 215. For example, a code may sent from computer system 700B that identifies the operating system for which UI modifiers are requested or the type of computer system which generated request 210 for returning only those results 215 which have sufficient priority values in priority table 420 to be rendered by computer system 700B.

In an embodiment, results 215 may include a digital signature for security purposes and generated using one or more parameters sent from computer system 700B or generated using a unique identifier of device 700A. Example parameters include a challenge-response nonce. Example unique identifiers include MAC identifier, serial number, or network address.

3.2 Rendering a User Interface with the Device Defined User Interface Modifiers

FIG. 2 illustrates an example process for rendering a user interface using device defined user interface modifier by a computer system in accordance with an example embodiment.

In an embodiment, the process starts at block 200. At block 205, a request 210 is sent to a device. For example, an operating system (OS) UI module 745 associated with computer system 700B sends request 210 to a device 700A requesting UI modifiers. In an alternate embodiment indicated by path 200A, the process is initiated by receiving UI modifiers "pushed" from device 700A. In this embodiment, the process receives results 215 from a device at block 220. For example, results 215 are received from device 700A.

In decision block 225, a test determines if results received at block 220 are UI modifiers. For example, OS UI module 745 determines if results received at block 220 are UI modifiers. If the received results at block 220 do not include UI modifiers, then in block 230 the received results 210 are processed appropriately. The process then proceeds to block 255 which ends processing.

In an embodiment, if received results at block 220 include UI modifiers, the process continues at block 250 where the UI is rendered using the received UI modifiers. For example, the OS UI module 745 renders the device UI. The process then proceeds to block 255, which ends processing.

In various embodiments, the process may obtain, cache and use new or different UI modifiers either in a pull mode or push mode. For example, a UI modifier caching approach may involve the device sending a notification to interested entities that a new modifier is available, by indicating updates in a certain type of UI modifier (display name, constraint, etc.). The entities then decide whether to retrieve the latest UI modifier of that type, and refresh their local copies of the UI modifier.

Alternatively, the process of FIG. 2 continues at decision block 235 and determines whether the received results at block 220 include new UI modifiers. If the received results at block 220 do not include new UI modifiers, then the existing UI modifiers are retrieved locally at block 245. For example, OS UI module 745 retrieves the existing UI modifiers 765 locally from a memory 715B. The process then proceeds to block 250 in which the device UI is rendered using the existing UI modifiers. For example, OS UI module 745 renders the device UI using the existing UI modifiers 765. The process then ends at block 255.

If the received results at block 220 do include new UI modifiers, then at block 240 the new UI modifiers are stored locally. For example, the OS UI module stores the new UI modifiers 765 locally. At block 250 the device UI is rendered using the new UI modifiers. For example, the OS UI module 745 renders the device UI using the new UI modifiers. The process then ends at block 255.

3.3 Example Data Structures

FIG. 3 illustrates a device user interface modifier table in accordance with an example embodiment.

In an embodiment, UI modifier module 750 generates one or more of device UI modifier tables 300, 310, 320, 330 which are commonly indexed using a feature index 301. The device UI modifier tables 300, 310, 320, 330 shown in FIG. 3 are associated respectively with different UI modifiers for display names, constraints, priorities, and visibility values. In other embodiments, different types of UI modifiers may be used.

Display names UI modifier table 300 includes feature index 301 which is an internal name for a feature or an option and used by the device for identifying purposes. The same value of feature index 301 is used across tables 300, 310, 320, and 330 to name the same feature.

In an embodiment, feature indices 301 are generated by UI modifier module 750 in a native language of device 700A. For example purposes only, the native device language is shown as hexadecimal codes which are used to uniquely identify a particular feature of device 700A. For simplicity and ease of understanding, a multi-function printer is used as a device example for discussion of device UI modifier tables 300, 310, 320, 330. Alternatively, any device coupled on path 775 with computer system 700B may be substituted for the printer used as an example.

The multifunction printer used in this example may be configured to perform functions such as collating, hole punching, stapling, media type selection, or media color selection. To illustrate a clear example, printer stapling is used hereinafter for discussion of device UI modifier tables 300, 310, 320, 330. The row(s) of interest in this example are outlined in heavy black lines.

The display names UI modifier table 300 comprises a feature index column 301, feature name column 303, and display name in English column 305. The feature index column 301 comprises values uniquely identifying features or options and expressed using labels or names. The feature name 303 column may be provided for including a short descriptive name that is used internally to describe a feature of the printer. However, the use of feature name column 303 is optional. In this example, the feature name 304 is shown as "Staple Location". In an embodiment, display names UI modifier table 300 includes display name in English column 305 as an English language name for a feature which may be included in a UI rendered by computer system 700B. If languages other than English are supported, then table 300 may include additional columns other than column 305, or column 305 may comprise names in languages other than English.

Constraints device UI modifier table 310 comprises a feature index column 301, disallowed feature column 311, and allowed feature column 313. The feature index column 301 comprises values uniquely identifying features and expressed using values that are compatible with a particular device language. The disallowed feature column 311 identifies one or more other features that are not allowed to be provided in a user interface when the corresponding feature of column 301 is provided. The allowed feature column 313 identifies one or more other features that are allowed to be provided in a user interface when the corresponding feature of column 301 is provided.

Priorities device user interface modifier table 320 comprises a feature index column 301 and priority value column 321. The feature index column 301 comprises values uniquely identifying features and expressed using values that are compatible with a particular device language. The priority value column 321 comprises one or more priority values for one or more features of the device indicated in the feature index column; thus, each of the one or more priority values is associated with an identifier of one of the features. Each of the priority values indicates a relative importance of the associated feature in comparison to other features. A computer system may use the priority values to determine which features are most important to display, and which can be omitted if needed, in a user interface that the computer system generates.

Visibility device UI modifier table 330 comprises a feature/option index column 331 and visibility value column 333. The feature/option index column 331 identifies a feature of a device. The visibility value column 333 comprises a value that indicates whether the associated feature of column 331 should be made visible in a user interface or not. Column 333 may carry a Boolean true/false value or other kinds of values.

Figure 6:
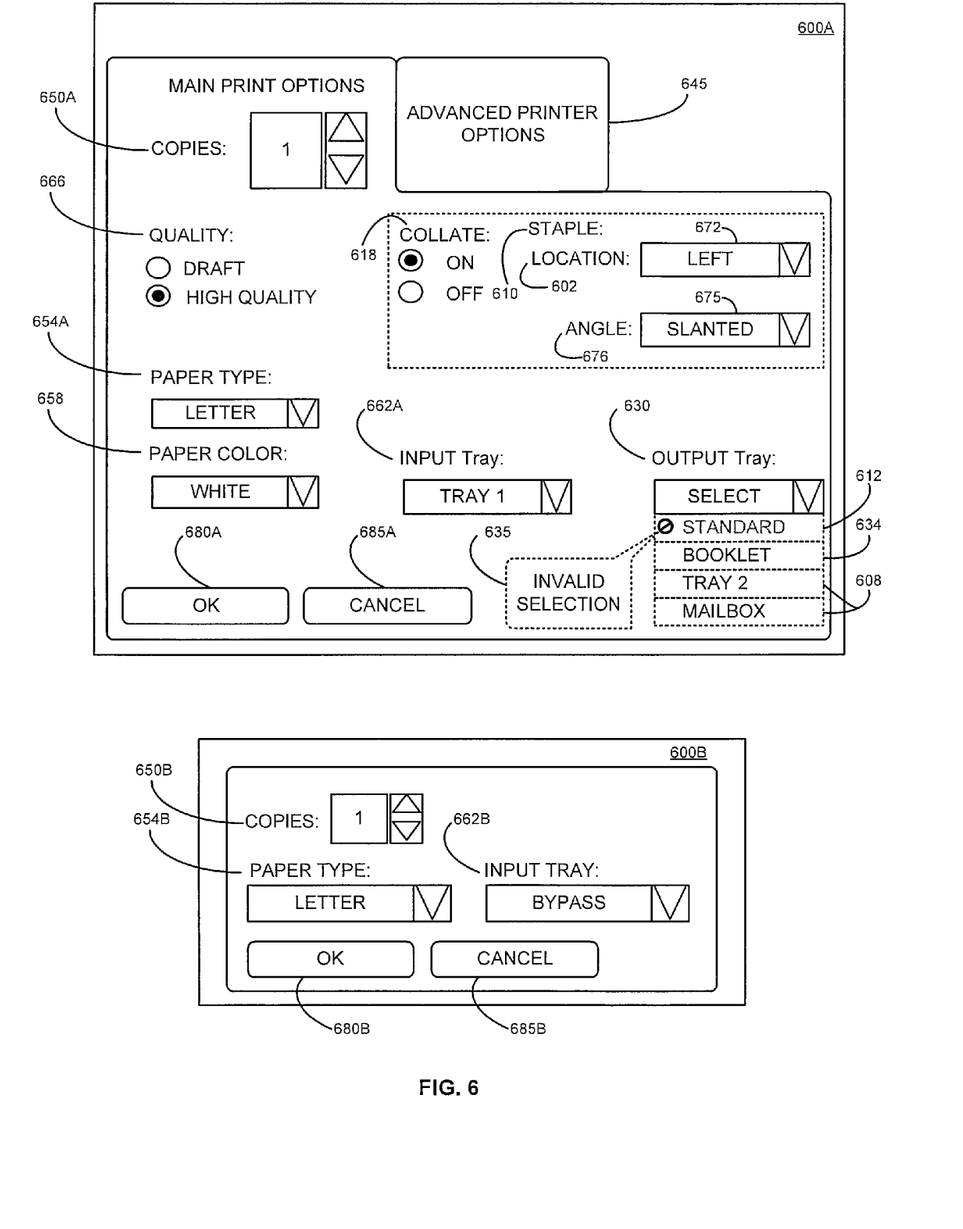
FIG. 6 illustrates a pair of rendered user interfaces in accordance with an example embodiment.

Continuing with the printer stapling example, "Staple Location" 304 is cross referenced using feature index 301 with hexadecimal code 302 having a value "0xFF03" and will be shown with display name "Location," 306 when rendered in a user interface 660 (FIG. 6). The display name may be in any of several languages and a particular display name is rendered in a particular language when that language is chosen by the client.

A stapler feature may require a certain device configuration in order to be implemented by the device. The required device configuration for the feature may be controlled by device constraints UI modifier table 310.

For example, "Staple Location" 304 cannot be used when the printer is configured with disallowed feature 311 as cross referenced by hexadecimal codes "0xFFC2" 312 ("Printer: Std Output Tray" 412; FIG. 4) or "0xFFC3" 316 ("Printer: Hole Punch" 416 of FIG. 4). Conversely, "Staple Location," 304 can be implemented when the printer is configured with allowed feature 313 as cross referenced with hexadecimal codes "0xDE02" 314 ("Booklet Tray" 414 of FIG. 4) or "0xDE03" 318 ("Collate On" 418 of FIG. 4). Values 316, 318 indicate other disallowed features and allowed features, respectively; thus multiple disallowed or allowed features may be associated in constraints table 310 with a single feature index value 302.

In an embodiment, a priority for rendering in the UI by computer system 700B of a particular feature may be specified or provided using the Priority UI modifier table 320. For example, feature 302 associated with hexadecimal code "0xFF03" 302 ("Staple Location" 304) is assigned a rendering priority value 322 of "6". In situations where a normal display is available to render a standard UI 600A (FIG. 6), all features 301 of any priority value 321 may be rendered. However, in situations where limited display capabilities exist for rendering a UI 600B (FIG. 6), rendering priority value 321 may be set so as to limit the features 301 that are rendered in the UI by computer system 700B.

For example, a personal digital assistant (PDA) might lack sufficient UI display area to render all of the features 301 available from the example printer. To accommodate the limited display area of the PDA, only those features 301 having a priority higher than "5" (for example, having a numeric value less than 5) would be rendered. Accordingly, the staple feature 302 associated with hexadecimal code "0xFF03" 302 would not be rendered in an UI for PDA 600B.

In an embodiment, visibility of a particular feature may be activated or suppressed when rendered in a UI by computer system 700B using device visibility UI modifier table 330. For example, the feature of column 331 associated with hexadecimal code "0xDE02" 314 ("Booklet Tray" 414 of FIG. 4) is made available for rendering when the entry 334 of visibility value column 333 is equal to Boolean value "True". Conversely, the feature of column 331 associated with hexadecimal code "0xDE03" 318 is suppressed from rendering when the entry 338 for visibility 333 is equal to Boolean value "False".

In an embodiment, a transport services mapping table 350 is generated by UI modifier module 750 for translating UI modifiers contained in device UI modifier tables 300, 310, 320, 330 from a native device language into a language which can easily be transported to and used by computer system 700B. In an abbreviated example, feature index 301 contained in device display name UI modifier table 300 is translated from hexadecimal codes to transport service names 351. For example, hexadecimal code "0xFF03" 302 is translated to "Printer: Staple Location" 352 in transport services mapping table 350. As previously discussed, transport services UI modifier mapping table 350 may be transitory or eliminated entirely.

In various embodiments the device UI modifier tables 300, 310, 320, 330 may be combined or organized in other formats or data structure to address particular functional requirements. Further, additional entries 308 may be included in the various columns and rows of device UI modifier tables 300, 310, 320, 330 to address a particular functional requirement.

Referring again to FIG. 4, in an embodiment, transport services UI modifier tables 400, 410, 420, 430 are generated by UI modifier module 750 from the transport services UI modifier mapping table 350 (FIG. 3). The transport services UI modifier tables 400, 410, 420, 430 illustrate the translation from device hexadecimal codes shown in device UI modifier tables 300, 310, 320, 330 to a language which can be transported to and used by computer system 700B using an intermediary transport protocol layer, for example, using Web Services or an XML formatted file structure.

For example, a display names transport services UI modifier table 400 comprises a feature index column 401, feature name column 403, and display name column 405. The feature index column 401 comprises values uniquely identifying features and expressed using labels or names that are compatible with a particular Web Services specification. The feature name column 403 column comprises internal names for corresponding features. The display name column 405 comprises names that are to be used in a user interface when corresponding features are displayed.

Constraints transport services UI modifier table 410 comprises a feature index column 401, disallowed feature column 411, and allowed feature column 413. The feature index column 401 comprises values uniquely identifying features and expressed using labels or names that are compatible with a particular Web Services specification. The disallowed feature column 411 identifies one or more other features that are not allowed to be provided in a user interface when the corresponding feature of column 401 is provided. The allowed feature column 413 identifies one or more other features that are allowed to be provided in a user interface when the corresponding feature of column 401 is provided.

Priorities transport services user interface modifier table 420 comprises a feature index column 401 and priority value column 421. The feature index column 401 comprises values uniquely identifying features and expressed using labels or names that are compatible with a particular Web Services specification. The priority value column 421 comprises one or more priority values for one or more features of the device indicated in the feature index column; thus, each of the one or more priority values is associated with an identifier of one of the features. Each of the priority values indicates a relative importance of the associated feature in comparison to other features. A computer system may use the priority values to determine which features are most important to display, and which can be omitted if needed, in a user interface that the computer system generates.

Visibility transport services UI modifier table 430 comprises a feature/option index column 431 and visibility value column 433. The feature/option index column 431 identifies a feature of a device. The visibility value column 433 comprises a value that indicates whether the associated feature of column 431 should be made visible in a user interface or not. Column 433 may carry a Boolean true/false value or other kinds of values.

Continuing with the printer stapling example discussed above, transport services display name UI modifier table 400 is translated by UI modifier module 750 from hexadecimal code "0xFF03" 302 to "Printer: Staple Location" 402. "Disallowed Feature" 311 is translated by UI modifier module 750 from hexadecimal codes "0xFFC2" 312 and "0xFFC2" 316 to "Printer: Std Output Tray" 412 and "Printer: Hole Punch" 416.

In an embodiment, device constraints UI modifier table 310 is translated by UI modifier module 750 from hexadecimal code "0xFF03" 302 to "Printer: Staple Location" 402. Allowed Feature 313 is translated by UI modifier module 750 from hexadecimal codes "0xDE02" 314 and "0xDE03" 318 to "Booklet Tray" 414 and "Collate On" 418 in transport services constraints UI modifier table 410.

In an embodiment, device priorities UI modifier table 320 is translated by UI modifier module 750 from hexadecimal code "0xFF03" 302 to "Printer: Staple Location" 402 in the transport services priorities UI modifier Table 420.

In an embodiment, device priorities UI modifier table 320 is translated by UI modifier module 750 from hexadecimal codes "0xDE02" 314 and "0xDE03" 318 to "Booklet Tray" 432 and "Printer: Hole Punch" 436 in the transport services visibility UI modifier table 430. Thus, table 430 indicates that the "Booklet Tray" feature 432 should be made visible in a user interface because entry 434 in the visibility column 433 is True. Conversely, the "Printer:Hole Punch" feature 436 is to be invisible in a user interface because entry 438 is False.

In various embodiments, the transport services UI modifier tables 400, 410, 420, 430 may be combined or organized in other formats or data structures to address particular functional requirements. Additional entries 408 may be included in the various columns and rows of transport services UI modifier tables 400, 410, 420, 430 to address a particular functional requirement.

In an embodiment, any of the UI modifier tables described with respect to FIGS. 3 and 4 may be created by a device vendor at device manufacturing time or thereafter by a deployment engineer or a system configuration administrator or integrator or similar persons.

3.4 Example User Interfaces

Figure 5:
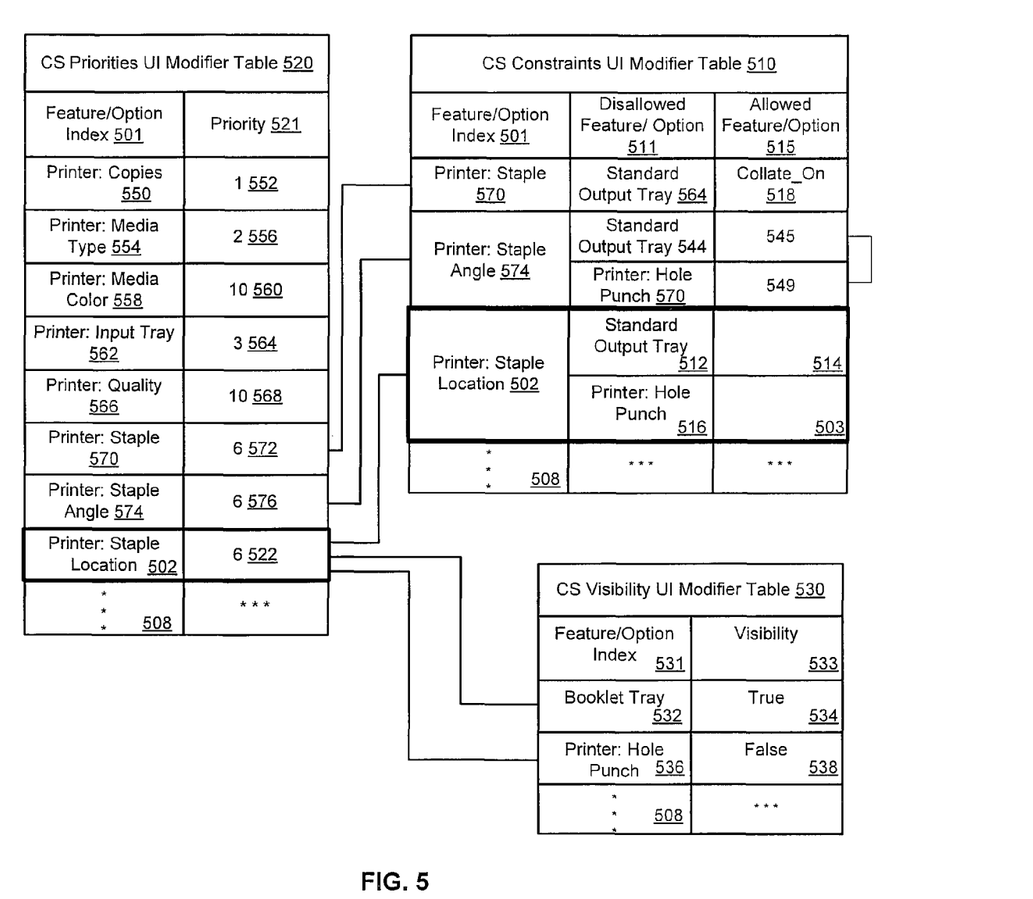
FIG. 5 illustrates a computer system user interface table in accordance with an example embodiment.

FIG. 5 illustrates a computer system user interface table in accordance with an example embodiment. In an embodiment, computer system (CS) priorities UI modifier table 520, CS constraints UI modifier table 510, and CS visibility UI modifier table 530 are shown. Tables 510, 520, 530 are discussed in conjunction with FIG. 6.

FIG. 6 illustrates a pair of rendered user interfaces in accordance with an example embodiment. A first user interface 600A illustrates rendering of UI modifiers generated by a printer device and sent to a computer system. In the example of FIG. 6, user interface 600A comprises a main print options tab and an advanced printer options tab 645 that is hidden in the example. The main print options tab comprises a copies widget 650A, quality radio buttons 666, paper type combo box 654A, paper color combo box 658, OK button 680A, Cancel button 685A, input tray combo box 662A, and output tray combo box 630. The main print options tab also comprises collate radio buttons 618, staple location combo box 672, and staple angle combo box 675. The output tray combo box 630 comprises options 612, 634, 608 and can display an invalid selection indicator 635.

In an embodiment, where computer system 700B is not generally restricted in the ability to display a feature associated with a device, rendering of a user interface may be accomplished which incorporates most or all of the features indexed in feature index column 501 of CS priorities UI modifier table 520 of FIG. 5.

For example, continuing with the printer example first introduced in the discussion accompanying FIG. 3 and following thereafter, CS priorities UI modifier table 520 provides a number of priority values 521 for rendering in user interface 600A, including "Printer: Copies," 550 having a priority value 552 of "1". Since "Printer: Copies" 550 has a priority value 552 of "1", this CS display name UI modifier is always rendered as seen in user interface widgets 650A, 650B in both user interfaces 600A, 600B.

However, priorities UI modifier 521 for "Printer: Media Type" 554, "Printer: Media Color" 558, Printer: Input Tray" 562, "Printer: Quality" 566, "Printer: Staple" 570, "Printer: Staple Angle" 574 and "Printer: Staple Location" 502 all have associated priority values 556, 560, 564, 568, 572, 576, 522 that are lower than "1". Therefore, these features are to be rendered in a UI only if a display associated with computer system 700B can accommodate the CS UI modifiers contained in CS UI modifier tables 510, 520, 530. The computer system 700B is permitted to omit these features if its display cannot accommodate displaying the features.

For example, UI 600B for a PDA allows all UI modifiers to be rendered which are assigned a priority value of 1 to 5. Accordingly, only "Printer: Copies," 650B (FIG. 6), "Printer: Paper Type" 654B," Printer: Input Tray" 662B are shown rendered in the more limited PDA UI 600B, while all of the UI modifiers are rendered in the standard printer UI 600A.

For example, display name UI modifier "Printer: Quality" 666, "Printer: Paper Color" 658, "Printer: Output Tray" 630, "Collate" 618, "Printer: Staple" 610, "Printer: Staple Location" 672, and "Printer: Staple Angle", are rendered in standard UI 600A.

Referring again to FIG. 5, CS constraints UI modifier table 510 illustrates how constraint UI modifiers are implemented. For example, feature 501 of "Printer: Staple" 570 is a disallowed feature 511 when the "standard output tray" feature of entry 542 is selected. The converse is also true; thus, the features are configured as mutually exclusive. However, "Printer: Staple" feature 570 is an allowed feature with a "Collate On" feature because entry 518 identifies the Collate On feature. Referring again to FIG. 6, the relationship between the "Collate On" widget 618 from CS UI modifier constraints 514, 518 (FIG. 5) allows display of "Staple" features 610 including "Location" 602 (in Left position 672) and "Angle" 676.

Similarly, for feature "Printer:Staple Angle" 574, associated features "Standard Output Tray" in entry 544 and "Printer: Hole Punch" in entry 549 are disallowed in the UI. For feature "Printer:Staple Location" 502, the features "Standard Output Tray" 512 and "Printer: Hole Punch" 516 are not allowed in the UI. Other features could be designated as allowed in the UI. However, for the Printer:Staple feature of entry 570, the "Standard Output Tray" feature of entry 564 is disallowed in the GUI but the "Collate On" feature of entry 518 is allowed, indicating that when the printer is set to staple, the standard output tray cannot be used but collating the output paper can be performed.

Referring back again to FIG. 5, CS visibility UI modifier table 530 allows certain features as shown in feature/option index column 531 to be rendered or suppressed in standard UI 600A depending on the value of Visibility column 533. For example, feature "Booklet Tray" 532 is allowed to be rendered because its corresponding Visibility value 534 is "True" and therefore the feature appears in the "Output Tray" drop down list box 630 as option 634. Conversely, feature "Printer: Hole Punch" is suppressed because its Visibility value 538 is "False" and therefore it is not rendered in standard printer UI 600A.

Referring again to FIG. 6, in an embodiment, an otherwise available feature, such as Standard output tray 612, may be rendered in "Output Tray" drop down list box 630, but rendered in such a way as to make selection of a particular feature unavailable. For example, standard output tray 612 may be grayed out when "Collate On" 618 feature is selected. In an embodiment, a graphical icon or invalid selection bubble 635 may be displayed in standard printer UI 600A if an attempt is made to select "standard output tray" feature 612.

The embodiments described above provide numerous beneficial effects. In an embodiment, clients can create up-to-date, consistent, customized and powerful user interfaces to the users of a device. The device provides aspects of the client's UI information to aid the client in creating the UI, without limiting the display freedom of the client. Indeed, embodiments can provide even more flexibility in how a client creates a UI. In an embodiment, at least a portion of business logic may be separated from the display logic of the UI, so that a device can control the business logic and allow the client to control display logic. If a device is updated, the client and its UI creation process does not need to change to accommodate the new device change. Client and driver development may be simpler, and reliance on an operating system is reduced.

4.0 Implementation Mechanisms—Hardware Overview

FIG. 7 illustrates a computer system upon which one or more embodiments may be implemented.

In an embodiment, device 700A includes a processor 705A for implementing the various executable instructions included in a transport services module 725A, UI modifier module 750, a mapping module 720 or other modules 730A associated with device 700A. The term "module" as used herein refers to one or more computer programs, other software elements, firmware, hardware, or other logic that perform a particular task. The various modules referred to herein include interfaces, constants, data types, data structures, variables, and routines that are accessible by other modules or routines, and the routines that implement the functions of the module.

In an embodiment, UI modifier module 750 includes the components for generating display name UI modifiers and device UI modifier table 300 (FIG. 3), device constraints UI modifiers and device UI modifier table 310, device priorities UI modifiers, device priorities UI modifiers table 320 and device visibility UI modifiers and device visibility UI modifiers table 330. In an embodiment, mapping module 720 includes the components for translating device UI modifiers contained in device UI modifier tables 300, 310, 320, 330 from a native device language into a language which can easily be transported to and used by computer system 700B.

In an embodiment, transport services module 725A includes the components for receiving translated UI modifiers generated by mapping module 720 and generating transport services UI modifier tables 400, 410, 420, 430 and exchanging information between device 700A and computer system 700B using a communications interface 710A. In an embodiment, transport services module 725A utilizes web services for supporting the exchange of information between device 700A and computer system 700B over a communications link 775. In various embodiments, a communications protocol other than web services may be used for the exchange of information between device 700A and computer system 700B. For example, simple network management protocol (SNMP) may be used. One or more other modules 730A may be provided in device 700A for performing additional functions.

Communication interface 710A is coupled to processor 705A and provides the physical and logical connection for the exchange of information between device 700A and computer system 700B over communications link 775. The various device modules 720, 725A, 730A, 750 are operatively stored in a memory 715A. Memory 715A is coupled to processor 705A and may be provided in various forms and combinations including random access memory (RAM), read only memory (ROM), EEPROM, flash RAM, and as a magnetic or optical disk (not shown). Communications link 775 may be of any type, for example, a direct connection with computer system 700B using a parallel, serial, Firewire, USB, wireless Ethernet, Ethernet, etc. Bluetooth, infrared communications arrangements.

In an embodiment, computer system 700B is configured as a standard computer system which includes all of the functional components of a computer and its associated hardware, operating system (OS) software or operating environment including but not limited to personal computers (PC), desktops, laptops, tablet PC, personal digital assistants (PDA), cellular telephones, Internet appliances, any other intelligent devices, or any desired combination of these devices, that includes components that can execute all, or part, of the process of rendering a user interface with device defined user interface modifiers as described above.

Computer system 700B may further include standard user interface devices such as a keyboard, a mouse, and a display device, as well as, one or more standard input/output (I/O) devices, such as a optical disk drive, floppy disk drive, or other digital or waveform port, or other device capable of inputting data to or outputting data from computer system 700B. One skilled in the art will appreciate that the components not shown associated with device 700A or computer system 700B are well known and understood in the relevant art.

Computer system 700B includes a processor 705B for implementing the various executable instructions included in a transport services module 725B, an OS UI module 745, or other modules 730B associated with computer system 700B. Transport services module 725B performs the counterpart functions to device transport services module 725A provided with device 700A. In an embodiment, computer system (CS) UI modifier tables 510, 520, 530 (FIG. 5) are generated by transport services module 725B. The OS UI Module 745 may be incorporated into the computer system's operating system and may also include drivers 755 and applications 760 necessary to incorporate the UI modifiers generated by device 700A into a rendered user interface, for example, standard printer user interface 600A (FIG. 6) or the limited user printer user interface 600B (FIG. 6).

In an embodiment, the OS UI Module 745 further maintains a previously received set of UI modifiers 765. In this embodiment, the previously received set of UI modifiers 765 may be updated when a device configuration change has been detected by UI modifier module 750 of device 700A as described above in the discussion accompanying FIG. 1. One or more other modules 730B may be provided in computer system 700B for performing additional functions. A display interface 740 is operatively coupled to processor 705B for outputting to a display a user interface rendered using, for example, the UI modifiers 765 or received from device 700B.

A communication interface 710B compatible with communications interface 710A of device 700A is operatively coupled to processor 705B and provides the physical and logical connection for the exchange of information between computer system 700B and device 700A over communications link 775.

The embodiments herein are related to the use of device 700A and computer system 700B for implementing the techniques described herein. According to an embodiment, those techniques are performed by device 700A in response to processor 705A executing one or more sequences of one or more instructions contained in memory 715A. Such instructions may be read into memory 715A from another machine-readable medium, such as storage device (not shown). Execution of the sequences of instructions contained in memory 715A causes processor 705A to perform the process steps described herein.

In an embodiment, additional techniques are performed by computer system 700B in response to processor 705B executing one or more sequences of executable instructions contained in memory 715B. Such instructions may be read into memory 715B from another machine-readable medium, such as a storage device. Execution of the sequences of instructions contained in memory 715B causes processor 705B to perform the process steps described herein. In alternative embodiments, hard-wired circuitry may be used in place of or in combination with software instructions to implement the process steps. Thus, the various inventive embodiments are not limited to any specific combination of hardware circuitry and software.

The term "machine-readable medium" as used herein refers to any medium that participates in providing data that causes a machine to operate in a specific fashion. In an embodiment implemented using device 700A or computer system 700B, various machine-readable media are involved, for example, in providing instructions to processor 705A and processor 705B for execution. Such a medium may take many forms, including but not limited to storage media. Storage media includes both non-volatile media and volatile media. Non-volatile media includes, for example, optical or magnetic disks. Volatile or non-volatile media includes dynamic memory, such as memory 715A or memory 715B. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 705A or processor 705B for execution. For example, the instructions may initially be carried on a magnetic disk of a remote computer. The remote computer can load the instructions into its dynamic memory and send the instructions over a telephone line using a modem. A modem local to device 700A or computer system 700B can receive the data on the telephone line and use an infra-red transmitter to convert the data into an infra-red signal. An infra-red detector can receive the data carried in the infra-red signal and appropriate circuitry can carry the data to memory 715B, from which processor 705A or processor 705B retrieves and executes the instructions. The instructions received by memory 715A or memory 715B may optionally be stored on storage device (not shown) either before or after execution by processor 705A or processor 705B.

Communication interfaces 710A, 710B provide two-way data communications over communications link 775. Communication interfaces 710A, 700B may be integrated services digital network (ISDN) cards or a modem to provide a data communication connection to a corresponding type of telephone line. As another example, communication interfaces 710A, 700B may be a local area network (LAN) cards to provide a data communication connection to a compatible LAN. Wireless links may also be implemented. In any such implementation, communication interfaces 710A, 700B may operate as transceivers of electrical, radio frequency or optical signals that carry digital data streams representing various types of information.

Communications link 775 typically provides data communication through one or more networks to other data devices. For example, communications link 775 may provide a connection to a host computer (not shown) or to data equipment operated by an Internet Service Provider (ISP). ISP in turn provides data communication services through the world wide packet data communication network now commonly referred to as the "Internet". Communications link 775 and Internet both use electrical, electromagnetic or optical signals that carry digital data streams. The signals through the various networks and the signals on communications link 775 and through communication interfaces 710A, 700B, which carry the digital data to and from device 700A and computer system 700B, are example forms of carrier waves transporting the information.

Device 700A and computer system 700B can send messages and receive data, including program code, through communications link 775 and communication interfaces 710A, 700B. In the Internet example, a server may transmit a requested code for an application program through Internet, ISP, communications link 775 and communication interfaces 710A, 700B. The received code may be executed by processor 705A or processor 705B as it is received, or stored in a storage device, or other non-volatile storage for later execution. In this manner, device 700A or computer system 700B may obtain application code.

5.0 Extensions and Alternatives

In the foregoing specification, various inventive embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an example rather than a restrictive sense.

For example, certain embodiments have been described with respect to interfacing with printers or multifunction printers. The techniques herein are equally applicable to any other kind of computer peripheral device that has features and for which it may be useful for the device to provide user interface modifiers to a computer system. Examples of other peripheral devices with which the techniques may be used include: scanners; document finishers such as punchers, folders, binders, and staplers; external storage devices; still image or moving image cameras; music players; digital phones; digital sound recorders; monitors or displays; and hobby products or scientific products such as weather stations, model vehicles, telescopes, and measurement instruments.

What is claimed is:

1. A computer-implemented process comprising:
   in a computer peripheral device that is configured to be coupled to a computer system:
      the device self-determining one or more device features comprising device capabilities, functions, options and properties;
      wherein the device self-determines the device capabilities, functions, options and properties by executing program instructions to determine an actual configuration of the device at a time that the device receives a request to generate a device specific user interface in the computer system;
      using device features, the device creating and storing one or more device defined user interface modifiers that are defined by the device and configured to be used by the computer system to modify rendering of the device specific user interface in the computer system;
      providing the device defined user interface modifiers to the computer, and causing rendering, in the computer system, the device specific user interface based at least in part upon the provided device defined user interface modifiers;
      wherein the device defined user interface modifiers comprise the device features that are determined by the computer peripheral device, but not by a computer peripheral device driver, an operating system or other system element that is hosted by the computer peripheral device;
      the device generating the device defined user interface modifiers in a native device language and translating the device defined user interface modifiers to a language compatible with the computer system;
      wherein the translating comprises creating and storing an intermediary mapping table which associates a native device code with a feature for rendering at least a portion of the user interface by the computer system.

2. The process of claim 1, wherein the device defined user interface modifiers further comprise one or more display names, one or more constraints, and one or more visibility values; wherein each of the constraints describes whether an associated feature is allowed or disallowed in combination with another feature; wherein each of the visibility values specifies whether an associated feature shall be visible in a user interface display.

3. The process of claim 1, further comprising creating and storing the device defined user interface modifiers in a user interface modifier table in a memory of the device, wherein the user interface modifier table includes an index for associating a device code with a device feature.

4. The process of claim 1, wherein the device defined user interface modifiers comprise one or more priority values for one or more features of the device; wherein each of the one or more priority values is associated with an identifier of one of the features; wherein each of the priority values indicates a relative importance of the associated feature in comparison to other features.

5. The process of claim 1, further comprising storing the device defined user interface modifiers in the computer system, and updating the device defined user interface modifiers in the computer system in response to providing new device defined user interface modifiers from the device to the computer system.

6. A computer-implemented process comprising:
   in a computer peripheral device that is configured to be coupled to a computer system:
      the device self-determining one or more device features comprising device capabilities, functions, options and properties;
      wherein the device self-determines the device capabilities, functions, options and properties by executing program instructions to determine an actual configuration of the device at a time that the device receives a request to generate a device specific user interface in the computer system;
      using device features, the device creating and storing one or more device defined user interface modifiers that are defined by the device and configured to be used by the computer system to modify rendering of the device specific user interface in the computer system;
      providing the device defined user interface modifiers to the computer, and causing rendering, in the computer system, the device specific user interface based at least in part upon the provided device defined user interface modifiers;
      wherein the device defined user interface modifiers comprise the device features that are determined by the computer peripheral device, but not by a computer peripheral device driver, an operating system or other system element that is hosted by the computer peripheral device;
      the device dynamically pushing the device defined user interface modifiers to the computer system when a change to the actual configuration of the device is self-determined.

7. A non-transitory computer-readable storage medium storing one or more sequences of instructions which, when executed by one or more processors, cause the one or more processors to perform:
   in a computer peripheral device that is configured to be coupled to a computer system:
      the device self-determining features of the device comprising capabilities, functions, options and properties;
      wherein the device self-determines the device capabilities, functions, options and properties by executing program instructions to determine an actual configuration of the device;
      using device features, the device creating and storing one or more device defined user interface modifiers that are defined by the device and configured to be used by the computer system to modify rendering of a device specific user interface in the computer system;
      providing the device defined user interface modifiers to the computer system, and causing rendering, in the computer system, the device specific user interface based at least in part upon the provided device defined user interface modifiers;
      wherein the device defined user interface modifiers comprise the features that are determined by the computer peripheral device, but not by a computer peripheral device driver, an operating system or other system element that is hosted by the computer peripheral device;
      the device dynamically pushing the device defined user interface modifiers to the computer system when a change to the actual configuration of the device is self-determined.

8. The non-transitory computer-readable storage medium of claim 7, wherein the device defined user interface modifiers comprise one or more priority values for one or more features of the device; wherein each of the one or more priority values is associated with an identifier of one of the features; wherein each of the priority values indicates a relative importance of the associated feature in comparison to other features.

9. The non-transitory computer-readable storage medium of claim 7, wherein the device defined user interface modifiers further comprise one or more display names, one or more constraints, and one or more visibility values;
   wherein each of the constraints describes whether an associated feature is allowed or disallowed in combination with another feature; wherein each of the visibility values specifies whether an associated feature shall be visible in a user interface display.

10. The non-transitory computer-readable storage medium of claim 7, further comprising instructions which when executed cause generating the device defined user interface modifiers in a native device language and translating the device defined user interface modifiers to a language compatible with the computer system.

11. The non-transitory computer-readable storage medium of claim 7, further comprising instructions which when executed cause creating and storing the device defined user interface modifiers in a user interface modifier table in a memory of the device, wherein the user interface modifier table includes an index for associating a device code with a device feature.

12. The non-transitory computer-readable storage medium of claim 7, wherein the device is a printer coupled to a computer system.

13. The non-transitory computer-readable storage medium of claim 7, wherein the device is a multifunction printer.

14. The non-transitory computer-readable storage medium of claim 7, further comprising instructions which when executed cause storing the device defined user interface modifiers in the computer system, and updating the device defined user interface modifiers in the computer system in response to providing new device defined user interface modifiers from the device to the computer system.

15. An image forming apparatus comprising:
   one or more processors;
   a computer interface configured to couple the image forming apparatus to a computer system;
   a computer-readable storage medium storing one or more sequences of instructions which, when executed by the one or more processors, cause:
      a device self-determining one or more features comprising device capabilities, functions, options and properties;
      wherein the device self-determines the device capabilities, functions, options and properties by executing program instructions to determine an actual configuration of the device;
      using device features, the device creating and storing one or more device defined user interface modifiers that are defined by the apparatus and configured to be used by a computer system to modify rendering of a device specific user interface in the computer system;
      providing the apparatus defined user interface modifiers to the computer system, and causing rendering, in the computer system, the device specific user interface based at least in part upon the provided device defined user interface modifiers;

wherein the device defined user interface modifiers comprise the features that are determined by the computer peripheral device, but not by a computer peripheral device driver, an operating system or other system element that is hosted by the computer peripheral device;

the device dynamically pushing the device defined user interface modifiers to the computer system when a change to the actual configuration of the device is self-determined.

16. The image forming apparatus of claim 15, wherein the device defined user interface modifiers comprise one or more priority values for one or more features of the device;

wherein each of the one or more priority values is associated with an identifier of one of the features; wherein each of the priority values indicates a relative importance of the associated feature in comparison to other features.

17. The image forming apparatus of claim 15, wherein the device defined user interface modifiers further comprise one or more display names, one or more constraints, and one or more visibility values; wherein each of the constraints describes whether an associated feature is allowed or disallowed in combination with another feature; wherein each of the visibility values specifies whether an associated feature shall be visible in a user interface display.

18. The image forming apparatus of claim 15, wherein the computer-readable storage medium further comprises instructions which, when executed, cause generating the device defined user interface modifiers in a native device language and translating the device defined user interface modifiers to a language compatible with the computer system.

19. The image forming apparatus of claim 15, wherein the computer-readable storage medium further comprises instructions which, when executed, cause creating and storing the device defined user interface modifiers in a user interface modifier table in a memory of the device, wherein the user interface modifier table includes an index for associating a device code with a device feature.

20. The image forming apparatus of claim 15, wherein the device is a printer coupled to a computer system.

21. The image forming apparatus of claim 15, wherein the device is a multifunction printer.

22. The image forming apparatus of claim 15, wherein the computer-readable storage medium further comprises instructions which, when executed, cause storing the device defined user interface modifiers in the computer system, and updating the device defined user interface modifiers in the computer system in response to providing new device defined user interface modifiers from the device to the computer system.

23. An image forming apparatus comprising:

one or more processors;

a computer interface configured to couple the image forming apparatus to a computer system;

a computer-readable storage medium storing one or more sequences of instructions which, when executed by the one or more processors, cause the one or more processors to perform:

a device self-determining one or more features comprising device capabilities, functions, options and properties;

wherein the device self-determines the device capabilities, functions, options and properties by executing program instructions to determine an actual configuration of the device;

using device features, the device creating and storing one or more device defined user interface modifiers that are defined by the apparatus and configured to be used by a computer system to modify rendering of a device specific user interface in the computer system;

providing the apparatus defined user interface modifiers to the computer system, and causing rendering, in the computer system, the device specific user interface based at least in part upon the provided device defined user interface modifiers;

wherein the device defined user interface modifiers comprise the features that are determined by the computer peripheral device, but not by a computer peripheral device driver, an operating system or other system element that is hosted by the computer peripheral device;

the device dynamically pushing the device defined user interface modifiers to the computer system when a change to the actual configuration of the device is self-determined.

* * * * *